United States Patent
Lee et al.

(10) Patent No.: US 9,972,845 B2
(45) Date of Patent: May 15, 2018

(54) NEGATIVE ELECTRODE ACTIVE MATERIAL AND METHOD OF MANUFACTURING THE SAME

(71) Applicant: LG Chem, Ltd., Seoul (KR)

(72) Inventors: Su Yeon Lee, Daejeon (KR); Sun Young Shin, Daejeon (KR); Su Min Lee, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days. days.

(21) Appl. No.: 15/108,028

(22) PCT Filed: Jun. 10, 2015

(86) PCT No.: PCT/KR2015/005839
§ 371 (c)(1),
(2) Date: Jun. 24, 2016

(87) PCT Pub. No.: WO2015/190833
PCT Pub. Date: Dec. 17, 2015

(65) Prior Publication Data
US 2016/0322636 A1    Nov. 3, 2016

(30) Foreign Application Priority Data
Jun. 13, 2014 (KR) .................. 10-2014-0071893

(51) Int. Cl.
| | | |
|---|---|---|
| *H01M 4/587* | (2010.01) | |
| *H01M 4/1393* | (2010.01) | |
| *H01M 4/36* | (2006.01) | |
| *H01M 4/62* | (2006.01) | |
| *H01M 10/0525* | (2010.01) | |
| *H01M 4/133* | (2010.01) | |
| *H01M 4/02* | (2006.01) | |

(52) U.S. Cl.
CPC .......... *H01M 4/587* (2013.01); *H01M 4/133* (2013.01); *H01M 4/1393* (2013.01); *H01M 4/366* (2013.01); *H01M 4/625* (2013.01); *H01M 10/0525* (2013.01); *H01M 2004/021* (2013.01); *H01M 2004/027* (2013.01)

(58) Field of Classification Search
CPC ....... H01M 10/0525; H01M 2004/021; H01M 2004/027; H01M 4/133; H01M 4/1393; H01M 4/366; H01M 4/587; H01M 4/625
See application file for complete search history.

(56) References Cited

U.S. PATENT DOCUMENTS

| 6,040,092 | A | 3/2000 | Yamada et al. |
| 6,482,547 | B1 * | 11/2002 | Yoon .................. H01M 4/133 |
| | | | 429/218.1 |
| 2002/0076614 | A1 | 6/2002 | Yoon et al. |
| 2009/0098448 | A1 | 4/2009 | Ozaki et al. |
| 2010/0099031 | A1 * | 4/2010 | Kato ................... H01M 10/052 |
| | | | 429/330 |
| 2010/0178563 | A1 | 7/2010 | Ozaki et al. |
| 2012/0288768 | A1 | 11/2012 | Lee et al. |
| 2013/0288131 | A1 | 10/2013 | Chang et al. |
| 2013/0323601 | A1 | 12/2013 | Nishimura et al. |
| 2016/0056449 | A1 | 2/2016 | Woo et al. |

FOREIGN PATENT DOCUMENTS

| CN | 103190018 A | 7/2013 |
| CN | 103314473 A | 9/2013 |
| JP | 09237638 A | 9/1997 |
| JP | H11329436 A | 11/1999 |
| KR | 1019990080594 A | 11/1999 |
| KR | 20020057347 A | 7/2002 |
| KR | 101084847 B1 | 11/2011 |
| KR | 101190368 B1 | 10/2012 |
| KR | 1020120113685 | 10/2012 |
| KR | 1020120129881 A | 11/2012 |

OTHER PUBLICATIONS

International Search Report for Application No. PCT/KR2015/005839 dated Sep. 22, 2015.
Extended European Search Report for Application No. EP15806625 dated May 16, 2017.
Chinese Search Report for Application No. 2015800048200 dated Feb. 2, 2018.

* cited by examiner

*Primary Examiner* — Carlos Barcena
(74) *Attorney, Agent, or Firm* — Lerner, David, Littenberg, Krumholz & Mentlik, LLP

(57) ABSTRACT

The present invention relates to a negative electrode active material, and a method of manufacturing the same. The negative electrode active material includes a low crystalline artificial graphite and an amorphous carbon coating layer formed on the low crystalline artificial graphite, wherein an interplanar spacing $d_{002}$ of (002) plane is in a range of greater than 0.338 nm to less than 0.3396 nm, as measured by X-ray diffraction (XRD). When the negative electrode active material according to one exemplary embodiment of the present invention is used for lithium secondary batteries, a more stable SEI layer can be formed during reacting with an electrolyte solution, thereby improving initial efficiency and reversible capacity of the lithium secondary battery.

14 Claims, 6 Drawing Sheets

NEGATIVE ELECTRODE ACTIVE MATERIAL AND METHOD OF MANUFACTURING THE SAME

CROSS-REFERENCE TO RELATED APPLICATION

This application is a national phase entry under 35 U.S.C. § 371 of International Application No. PCT/KR2015/005839, filed Jun. 10, 2015, which claims priority to Korean Patent Application No. 10-2014-0071893, filed Jun. 13, 2014, the disclosures of which are incorporated herein by reference.

TECHNICAL FIELD

The present invention relates to a negative electrode active material and a method of manufacturing the same, and more particularly, to a negative electrode active material including low crystalline artificial graphite and an amorphous carbon coating layer formed on the low crystalline artificial graphite, wherein an interplanar spacing $d_{002}$ of a (002) plane is in a range of greater than 0.338 nm and less than 0.3396 nm, as measured by X-ray diffraction (XRD), and a method of manufacturing the same.

BACKGROUND ART

With the recent development of information and communications industry, electronic equipment has been manufactured in smaller, lighter, thinner and more portable fashions. Accordingly, there is an increasing demand for technology of high energy density for batteries used as power sources of such electronic equipment. Lithium secondary batteries are batteries that can best meet such requirements, and thus is being actively researched.

A carbonaceous material has been used as a negative electrode material for lithium secondary batteries. The carbonaceous material includes crystalline carbon and amorphous carbon. The crystalline carbon representatively includes graphite carbon such as natural graphite, and artificial graphite, and the amorphous carbon includes hard carbon (i.e., non-graphitizable carbon) obtained by carbonizing a polymeric resin, soft carbon (i.e., graphitizable carbon) obtained by thermally treating pitch, etc.

In general, soft carbon is made by applying heat having a temperature of approximately 1,000° C. to coke that is a by-product generated during a process of refining crude oil. Unlike conventional graphite-based negative electrode active materials or hard carbon-based negative electrode active materials, the soft carbon has high power and a short period of time required for charging. However, when the soft carbon is used in lithium secondary batteries, an increase in irreversible capacity may be caused, resulting in poor initial efficiency and low reversible capacity.

Such an increase in irreversible capacity is caused when an electrolyte decomposes on a surface of an electrode during charging in order to form a solid electrolyte interphase (SEI) layer as a surface film, and when lithium ions stored in carbon particles during charging are not released during discharging. Among these, the former is a more serious problem, and is known to be a main irreversible cause in forming the surface film.

Accordingly, there is a demand for developing negative electrode active materials capable of replacing conventional negative electrode active materials and improving all discharging capacity, efficiency, and output characteristics when applied to lithium secondary batteries.

PRIOR-ART DOCUMENT

Korean Unexamined Patent Application Publication No. 10-2012-0113685

DISCLOSURE

Technical Problem

The present invention is designed to solve the problems of prior art, and therefore it is an object of the present invention to provide a negative electrode active material capable of forming a stable SEI layer to improve initial efficiency and reversible capacity, and a method of manufacturing the same.

Technical Solution

To solve the problems of prior art, according to an aspect of the present invention, there is provided a negative electrode active material including low crystalline artificial graphite, and an amorphous carbon coating layer formed on the low crystalline artificial graphite, wherein an interplanar spacing $d_{002}$ of (002) plane is in a range of greater than 0.338 nm to less than 0.3396 nm, as measured by X-ray diffraction (XRD).

According to another aspect of the present invention, there is provided a method of manufacturing a negative electrode active material, which includes sintering soft carbon at a temperature range of 2,000° C. or higher to 2,800° C. to obtain low crystalline artificial graphite, and forming an amorphous carbon coating layer on the low crystalline artificial graphite.

According to still another aspect of the present invention, there is provided a negative electrode including the negative electrode active material.

According to yet another aspect of the present invention, there is provided a lithium secondary battery including the negative electrode.

Advantageous Effects

The negative electrode active material according to exemplary embodiments of the present invention includes an amorphous carbon coating layer formed on low crystalline artificial graphite, and wherein an interplanar spacing $d_{002}$ of (002) plane is in a certain range of greater than 0.338 nm and less than 0.3396 nm, as measured by XRD, and thus can be useful in forming a more stable SEI layer when the negative electrode active material is allowed to react with an electrolyte solution. Also, when such a negative electrode active material is included, a lithium secondary battery having improved initial efficiency and reversible capacity can be manufactured.

DESCRIPTION OF DRAWINGS

The following drawings accompanied in this specification are provided to exemplify preferred embodiments of the present invention, and serve to aid in understanding the scope of the present invention in conjunction with the above-described contents of the present invention. Therefore, it should be understood that the present invention is not intended to limit the contents shown in the drawings.

BEST MODE

Figures 1A, 1B:
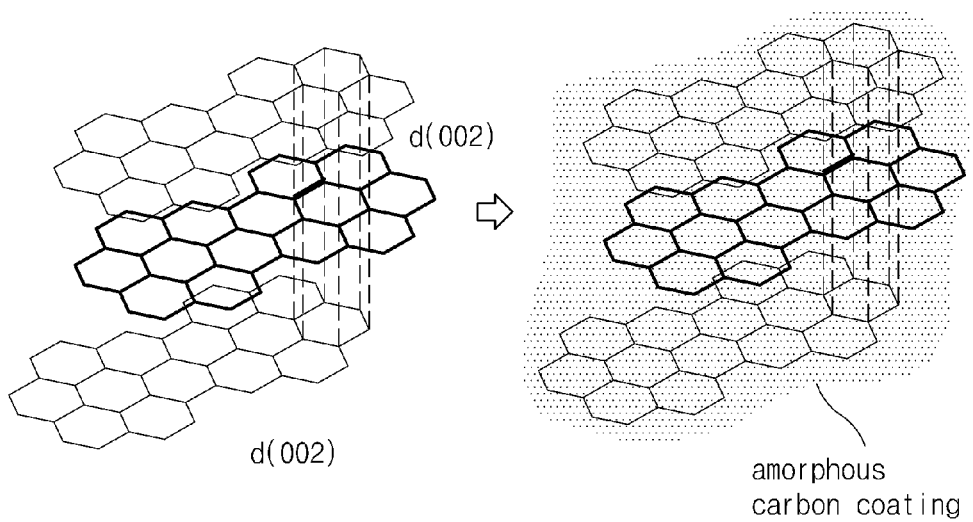
FIG. 1A is a schematic diagram showing a negative electrode active material according to one exemplary embodiment of the present invention, which includes low crystalline artificial graphite.
FIG. 1B is a schematic diagram showing a negative electrode active material according to one exemplary embodiment of the present invention, which includes an amorphous carbon coating layer formed on the low crystalline artificial graphite.

Hereinafter, the present invention will be described in further detail in order to aid in understanding the present invention.

The terms or words used in the specification and claims of the present invention are not to be construed as limited to ordinary or dictionary meanings, but should be construed as meanings and concepts conforming to the technical spirit of the present invention on the basis of the principle that the inventors can define the concept of the terms properly to explain their invention with the best method.

According to one aspect of the present invention, the present invention may provide a negative electrode active material including low crystalline artificial graphite; and an amorphous carbon coating layer formed on the low crystalline artificial graphite, wherein an interplanar spacing $d_{002}$ of (002) plane is in a range of greater than 0.338 nm and less than 0.3396 nm, as measured by X-ray diffraction (XRD) analysis.

Specifically, the negative electrode active material according to one exemplary embodiment of the present invention includes an amorphous carbon coating layer formed on low crystalline artificial graphite, and wherein an interplanar spacing $d_{002}$ of (002) plane is in a certain range of greater than 0.338 nm and less than 0.3396 nm, as measured by XRD, and thus can be useful in forming a more stable SEI layer when the negative electrode active material is allowed to react with an electrolyte solution, and remarkably improving initial efficiency and reversible capacity.

In the negative electrode active material according to one exemplary embodiment of the present invention, the low crystalline artificial graphite is obtained by sintering soft carbon at a temperature of approximately 2,000° C. or higher to less than 2,800° C., and may be in the form of meso carbon that is mesophase graphite between soft carbon and artificial graphite.

Generally, amorphous carbon or crystalline carbon has been used as a negative electrode active material for lithium secondary batteries. Among these, crystalline carbon has been widely used due to its high capacity. Such crystalline carbon is natural graphite, or artificial graphite. However, such crystalline carbon has a problem regarding low capacity in an aspect of energy density per unit volume of an electrode, and has a problem in that its side reaction with an organic electrolyte solution used at a high discharging voltage may easily occur.

Accordingly, graphite is pulverized to crystallize into low crystalline graphite, which is then used as a negative electrode active material. In this case, however, since graphite is already converted into high crystalline graphite, it may be difficult to increase the interplanar spacing $d_{002}$ even when graphite is pulverized using a physical force. Also, since the interplanar spacing $d_{002}$ is not constant, the output characteristics may be degraded.

On the other hand, according to one exemplary embodiment of the present invention, since the low crystalline artificial graphite, which is crystallized in the form of meso carbon by sintering soft carbon at a high temperature, is slowly crystallized starting from soft carbon, the interplanar spacing $d_{002}$ of (002) plane, as measured by XRD, may be improved more uniformly, compared to conventional methods of pulverizing crystalline graphite to crystallize into low crystalline graphite. When the low crystalline graphite is applied to the negative electrode active material for lithium secondary batteries, the output characteristic may be improved.

Therefore, according to one exemplary embodiment of the present invention, the low crystallinity of the low crystalline artificial graphite may be defined for meso carbon which is mesophase graphite between artificial graphite and soft carbon having an interplanar spacing $d_{002}$ of (002) plane in a range of greater than 0.337 nm to less than 0.34 nm, as measured by XRD. In particular, the low crystalline artificial graphite according to one exemplary embodiment of the present invention may be characterized in that it has an interplanar spacing $d_{002}$ of (002) plane in a range of greater than greater than 0.338 nm and less than 0.3396 nm, as measured by XRD.

In this case, when the interplanar spacing $d_{002}$ of the low crystalline artificial graphite according to one exemplary embodiment of the present invention is less than or equal to 0.338 nm, the shape of graphite particles is near to the shape of high crystalline artificial graphite due to an increase in crystallinity. As a result, the capacity may be low in an aspect of energy density per unit volume of an electrode, and a side reaction with an organic electrolyte solution used at a high discharging voltage may easily occur. On the other hand, when the interplanar spacing $d_{002}$ of the low crystalline artificial graphite according to one exemplary embodiment of the present invention is greater than 0.3396 nm, crystallinity of graphite particles may be remarkably degraded, resulting in an increase in initial irreversible capacity and degraded electronic conductivity of graphite particles, which are not desirable.

Also, the low crystalline artificial graphite may have a peak's full width at half-maximum (FWHM) in a range of 0.5° or more to 0.6° or less, as measured by XRD.

According to one exemplary embodiment of the present invention, the soft carbon may be formed by carbonizing one or a mixed carbonaceous material of two or more selected from the group consisting of a polyvinyl alcohol, a polyvinyl chloride, a carboniferous pitch, a petroleum-based pitch, a mesophase pitch, and heavy oil.

Also, since the negative electrode active material according to one exemplary embodiment of the present invention includes an amorphous carbon coating layer formed on the low crystalline artificial graphite which has the interplanar spacing $d_{002}$ in this range as described above, a stable SEI layer may be formed to improve initial efficiency and reversible capacity which are disadvantages of the low crystalline artificial graphite.

That is, as shown in FIG. 1, when the low crystalline artificial graphite is used alone (see FIG. 1A), uniform resistance is not applied to the low crystalline artificial graphite, which makes it difficult to form a stable SEI layer, and thus results in a decrease in initial efficiency. When the low crystalline artificial graphite is used in an electrode for lithium secondary batteries, lithium ions may be irreversibly consumed at an increasing quantity.

Accordingly, when the amorphous carbon coating layer is formed on the low crystalline artificial graphite having an interplanar spacing $d_{002}$ in this certain range according to one exemplary embodiment of the present invention (see FIG. 1B), a more stable SEI layer may be formed since uniform resistance is applied due to coating. Also, the specific surface area in which a side reaction with an electrolyte solution occurs may be reduced.

When the negative electrode active material according to one exemplary embodiment of the present invention includes the amorphous carbon coating layer, the interplanar spacing $d_{002}$ of (002) plane may be in a range of greater than 0.338 nm and less than 0.3396 nm, as measured by XRD. In the negative electrode active material according to one exemplary embodiment of the present invention, when the interplanar spacing $d_{002}$ is less than 0.338 nm, an increase in crystallinity may make it relatively difficult to transfer lithium ions, resulting in degraded output performance. On the other hand, when the interplanar spacing $d_{002}$ is greater than 0.3396 nm, graphite may be converted into soft carbon due to loss of crystallinity caused by weak bonding in the c-axis of graphite.

The interplanar spacing $d_{002}$ of the negative electrode active material and the low crystalline artificial graphite may be calculated according to the following Equation 1, which is a Bragg's law, by plotting a graph using 2θ values measured using XRD and determining positions of peaks on the graph using an integration method.

$$d_{002} = \lambda / 2 \sin \theta \qquad \text{<Equation 1>}$$

Also, the negative electrode active material according to one exemplary embodiment of the present invention may have a crystal orientation index with respect to an area ratio $I_{(110)}/I_{(002)}$ in a range of 0.0238 to 0.0268. In this case, the area ratio is obtained by integrating XRD peaks strength of a (110) plane and a (002) plane, respectively, measured by XRD.

In addition, the (002) peak's full width at half-maximum (FWHM) may be in a range of 0.5° to 0.6°. In the present invention, the full width at half-maximum (FWHM) is a value obtained by quantifying a peak width at a ½ position of (002) peak intensity, which is obtained by measuring the negative electrode active material using XRD. The unit of the full width at half-maximum (FWHM) may be represented by a degree (°) that is the unit of 2θ. In this case, a negative electrode active material having higher crystallinity has a lower value of the full width at half-maximum.

Also, $L_c$ (002), which is a crystallite size in C-axis direction of a particle, can be calculated by Equation 2 below as Scherrer equation which calculates a crystallite size $L_c$ of the negative electrode active material.

$$L_c = \frac{K\lambda}{\beta_{(2\theta)}\cos\theta} \qquad \text{<Equation 2>}$$

K=Scherrer constant (K=0.9)
β=Full width at half-maximum
λ=Wavelength (0.154056 nm)
θ=Angle at maximum peak According to one exemplary embodiment of the present invention, the negative electrode active material may have a crystallite size Lc (002) of 15.1 nm to 15.7 nm, wherein $L_c$ (002) is a crystallite size in C-axis direction during XRD measurement using CuK. The crystallite size Lc (002) means that the negative electrode active material of the present invention has a crystallite size between soft carbon and artificial graphite, such that graphite is more crystallized than soft carbon and less crystallized than artificial graphite.

It is preferable that the negative electrode active material according to an embodiment of the present invention is in a non-spherical shape, such as a plate-like or needle-like shape, having an average aspect ratio (a length on the major axis/a length on the minor axis) of 0.1 to 1, preferably 0.3 to 0.5 in an aspect of tap density.

When the average aspect ratio of the negative electrode active material is less than above range, an area at which an SEI layer is formed may increase during an initial charging reaction due to an increase in specific surface area of the negative electrode active material, resulting in an increase in initial irreversible capacity. Also, an amount of a binder used to couple to a current collector may increase, resulting in a decrease in current density per unit volume of an electrode.

On the other hand, when the average aspect ratio of the negative electrode active material is greater than above range, the current density per unit volume may be degraded during the manufacture of electrodes, and a diffusion distance of lithium ions may lengthened due to a large particle size, which will result in degraded output characteristics.

In the present invention, the average aspect ratio of particles may be defined as a particle size based on 50% of the particle size distribution of the negative electrode active material, and may, for example, be measured through an SEM image.

The negative electrode active material according to one exemplary embodiment of the present invention has such a structure including an amorphous carbon coating layer formed on the low crystalline artificial graphite. Thus, since a friction area of surface reduces, tap density of the negative electrode active material may be improved. The tap density may be in a range of 0.6 g/cc to 1 g/cc, preferably 0.8 g/cc to 1 g/cc.

Also, the negative electrode active material according to one exemplary embodiment of the present invention may have a reduced specific surface area with an increasing coating amount of amorphous carbon in the amorphous carbon coating layer.

The specific surface area (Brunauer-Emmett-Teller; BET) of the negative electrode active material may be in a range of 1 m²/g to 10 m²/g, preferably 2 m²/g to 6 m²/g, and more preferably 3 m²/g to 6 m²/g. When the BET specific surface area is beyond this range, output characteristics and initial efficiency of the secondary battery may be degraded, and the residual capacity may be lowered upon high-temperature storage.

According to one exemplary embodiment of the present invention, the specific surface area of the negative electrode active material may be measured using a Brunauer-Emmett-Teller (BET) method. For example, it may be measured with BET six-point method by means of a nitrogen gas adsorption method using a porosimetry analyzer (Bell Japan Inc., Belsorp-II mini).

In the negative electrode active material according to one exemplary embodiment of the present invention, the thickness of the amorphous carbon coating layer may be preferably in a range of 50 nm to 700 nm, and the coating amount of amorphous carbon may be in a range of 0.1% by weight to 10% by weight, preferably 0.5% by weight to 4% by weight, based on the total weight of the negative electrode active material. In this case, when the coating amount of the amorphous carbon coating layer is too small, hardness and negative electrode density of the low crystalline artificial graphite may not be enhanced, orientability of a negative electrode may be degraded, and uniform resistance is not applied due to formation of a thin amorphous coating layer, which makes it difficult to form a stable SEI layer. On the other hand, when the coating amount of the amorphous carbon coating layer is too high, mobility of lithium ions may be hindered, which will result in degraded output characteristics.

Meanwhile, according to another aspect of the present invention, there is provided a method of manufacturing a negative electrode active material, which includes sintering soft carbon at a temperature range of approximately 2,000° C. or higher to less than 2,800° C., preferably 2,000° C. or higher to 2,500° C. to obtain low crystalline artificial graphite; and forming an amorphous carbon coating layer on the low crystalline artificial graphite.

In the method of manufacturing a negative electrode active material according to one exemplary embodiment of the present invention, the manufacture of the low crystalline artificial graphite may be performed by slowly low-crystallizing soft carbon as a starting material in order to ensure a desired interplanar spacing $d_{002}$ of (002) plane, as measured by XRD.

That is, soft carbon may be sintered at a high temperature range of approximately 2,000° C. or higher to less than 2,800° C. to obtain low crystalline artificial graphite having a more increased interplanar spacing $d_{002}$.

When the sintering temperature is less than this range, it may be difficult to obtain desired low crystalline artificial graphite, which makes it difficult to realize the desired capacity. On the other hand, when the sintering temperature is greater than 2,800° C., low crystalline artificial graphite particles may be recrystallized, or may be converted into high crystalline artificial graphite.

In this case, the sintering may be performed under an inert atmosphere by injecting nitrogen, argon, hydrogen, and a mixed gas thereof, and may optionally be performed under vacuum.

The soft carbon may be formed by carbonizing one or a mixed carbonaceous material of two or more selected from the group consisting of a polyvinyl alcohol, a polyvinyl chloride, a carboniferous pitch, a petroleum-based pitch, a mesophase pitch, and heavy oil, preferably one or a mixed pitch of two or more selected from the group consisting of a carboniferous pitch, a petroleum-based pitch, and a mesophase pitch.

In the method of manufacturing a negative electrode active material according to one exemplary embodiment of the present invention, the amorphous carbon coating layer may be formed by mixing low crystalline carbon particles with an amorphous carbon precursor, and thermally treating the resulting mixture.

In this case, a mixing ratio of the low crystalline carbon particle and the amorphous carbon precursor may be in a range of 100:0.2 to 20, preferably 100:1 to 100:8, based on the weight ratio.

The amorphous carbon precursor may be used without limitation as long as it can be used to form carbon by thermal treatment, and may, for example, be one or a mixture of two or more selected from the group consisting of glucose, fructose, galactose, maltose, lactose, sucrose, a phenolic resin, a naphthalene resin, a polyvinyl alcohol resin, a urethane resin, a polyimide resin, a furan resin, a cellulose resin, an epoxy resin, a polystyrene resin, a resorcinol-based resin, a phloroglucinol-based resin, a carboniferous pitch, a petroleum-based pitch, tar, and low molecular weight medium oil. Preferably, the amorphous carbon precursor may be one or a mixture of two or more selected from the group consisting of a carboniferous pitch, a petroleum-based pitch, tar, and low molecular weight medium oil.

In the method of manufacturing a negative electrode active material according to one exemplary embodiment of the present invention, the thermal treatment temperature used to form the amorphous carbon coating layer may be in a range of 160° C. to 1,400° C., preferably 900° C. to 1,400° C., and the thermal treatment time may be in a range of approximately 20 minutes to 20 hours, preferably 30 minutes to 10 hours.

When the thermal treatment temperature is less than 160° C., it is difficult to form the amorphous carbon coating layer due to a very low temperature. On the other hand, when the thermal treatment temperature is greater than 1,400° C., a desired crystal structure of a compound may be changed due to a very high temperature. Also, the thermal treatment may, for example, preferably be performed under an inert atmosphere in the presence of nitrogen gas, argon gas, helium gas, krypton gas, or xenon gas.

Also, the present invention provides a negative electrode including the negative electrode active material.

The negative electrode according to one exemplary embodiment of the present invention may be manufactured using a conventional method known in the related art. For example, a solvent, and optionally a binder, and a conductive material may be mixed with the negative electrode active material, and stirred to prepare slurry. Then, a current collector made of a metal material may be coated with the slurry, compressed, and dried to manufacture a negative electrode.

According to one exemplary embodiment of the present invention, the binder is used to maintain a molded article by binding negative electrode active material particles, and the binder, such as polytetrafluorethylene (PTFE), polyvinylidene fluoride (PVdF), styrene-butadiene rubber (SBR), and the like, may be used.

According to one exemplary embodiment of the present invention, the conductive material may be one or a mixture of two or more selected from the group consisting of natural graphite, artificial graphite, carbon black, acetylene black, ketjen black, channel black, furnace black, lamp black, thermal black, carbon nanotubes, fullerene, carbon fibers, metal fibers, fluorinated carbon, aluminum, nickel powder, zinc oxide, potassium titanate, titanium oxide, and a polyphenylene derivatives, and preferably carbon black.

Non-limiting examples of a negative electrode current collector according to one exemplary embodiment of the present invention includes foil made of copper, gold, nickel, a copper alloy, or a combination thereof.

Also, the present invention provides a lithium secondary battery using the negative electrode. Here, the lithium secondary battery includes a positive electrode, a negative electrode, a separator sandwiched between the positive electrode and the negative electrode, and an electrolyte in which a lithium salt is dissolved.

In the lithium secondary battery according to one exemplary embodiment of the present invention, the positive electrode and the electrolyte used herein may be made of materials widely used in the related art, but the present invention is not limited thereto.

The lithium secondary battery according to one exemplary embodiment of the present invention may include all the conventional lithium secondary batteries such as lithium metal secondary batteries, lithium ion secondary batteries, lithium polymer secondary batteries, or lithium ion polymer secondary batteries.

Also, an outer shape of the lithium secondary battery according to one exemplary embodiment of the present invention is not particularly limited, but may include a cylindrical shape using a can, an angular shape, a pouch-like shape, or a coin-like shape.

The lithium secondary battery according to one exemplary embodiment of the present invention may be used as a power source for various electronic products. For example, the lithium secondary battery may be used in a portable telephone, a mobile phone, a game console, a portable television, a notebook computer, a calculator, and the like, but the present invention is not limited thereto.

MODE FOR INVENTION

Hereinafter, the present invention will be described in further detail with reference to Examples to aid in understanding the present invention. However, the following Examples of the present invention may be changed in various forms, and thus provided for illustrative purposes only and are not intended to limit the scope of the present invention to the following Examples. Thus, the Examples of the present invention are provided to describe the present invention more completely, as apparent to those skilled in the art.

EXAMPLES

Hereinafter, the present invention will be described with reference to the following Examples and Experimental Examples. However, it should be understood that the description set forth herein is not intended to limit the present invention.

Manufacture of Negative Electrode Active Material

Example 1

A coal tar pitch obtained from coal by fractional distillation was coked, thermally treated at 550° C., and then sintered at 1,400° C. to obtain pitch coke (i.e., soft carbon) having a major axis length of 11.5 μm, a specific surface area of 6 $m^2$/g to 8 $m^2$/g, and a tap density of 1.3 g/cc.

The resulting pitch coke was sintered at approximately 2,000° C. for 10 hours to prepare low crystalline artificial graphite. The low crystalline artificial graphite had an interplanar spacing of (002) plane of 0.3396 nm, as measured by XRD.

Next, the low crystalline artificial graphite and a petroleum-based pitch were mixed at a weight ratio of 100:1, put into a sintering furnace, and sintered at a temperature of approximately 1,000° C. for 10 hours to obtain a negative electrode active material which includes the low crystalline artificial graphite coated with an amorphous carbon coating layer having an average major axis length of approximately 11.5 μm. The coating amount of the amorphous carbon coating layer was 0.5% by weight, based on the total weight of the negative electrode active material. The physical properties of the resulting low crystalline artificial graphite having the amorphous carbon coating layer formed thereon are listed in the following Table 1.

Example 2

A negative electrode active material was manufactured in the same manner as in Example 1, except that the low crystalline artificial graphite and the petroleum-based pitch were mixed at a weight ratio of 100:2, and the coating amount of the amorphous carbon coating layer was 1% by weight, based on the total weight of the negative electrode active material. The physical properties of the resulting low crystalline artificial graphite having the amorphous carbon coating layer formed thereon are listed in the following Table 1.

Example 3

A negative electrode active material was manufactured in the same manner as in Example 1, except that the low crystalline artificial graphite and the petroleum-based pitch were mixed at a weight ratio of 100:4, and the coating amount of the amorphous carbon coating layer was 2% by weight, based on the total weight of the negative electrode active material. The physical properties of the resulting low crystalline artificial graphite having the amorphous carbon coating layer formed thereon are listed in the following Table 1.

TABLE 1

| | Component | $d_{002}$ (nm) | Degree of crystallization (DOG) | $I_{110}/I_{004}$ Index | Crystallite size (nm) Lc | La | Rhombohedral content (%) |
|---|---|---|---|---|---|---|---|
| Example 1 | Low crystalline artificial graphite | 0.3396 | 0.5166 | 0.4636 | 15.4 | 38.5 | 12.3 |
| | Low crystalline artificial graphite + amorphous coating layer | 0.3390 | 0.5859 | 0.4775 | 15.1 | 39.7 | 12.8 |

TABLE 1-continued

| | Component | $d_{002}$ (nm) | Degree of crystallization (DOG) | $I_{110}/I_{004}$ Index | Crystallite size (nm) Lc | La | Rhombohedral content (%) |
|---|---|---|---|---|---|---|---|
| Example 2 | (0.5 wt %) Low crystalline artificial graphite + amorphous coating layer | 0.3387 | 0.6196 | 0.5049 | 15.2 | 39.7 | 12.8 |
| Example 3 | (1 wt %) Low crystalline artificial graphite + amorphous coating layer (2 wt %) | — | — | — | 15.7 | 39.9 | 12.4 |

As listed in Table 1, it could be seen that the degree of crystallization tended to decrease with an increasing coating content of amorphous carbon, and the (110) degree of orientation and the like tended to increase due to amorphousness.

Comparative Example 1

A coal tar pitch obtained from coal by fractional distillation was coked, thermally treated at 550° C., and then sintered at 1,400° C. to obtain pitch coke (i.e., soft carbon) having a major axis length of 10 μm to 12 μm, a specific surface area of 6 m$^2$/g to 8 m$^2$/g, and a tap density of 1.3 g/cc.

Comparative Example 2

Low crystalline artificial graphite was manufactured in the same manner as in Example 1, except that a subsequent process of forming an amorphous carbon coating layer described in Example 1 was not performed.

Comparative Example 3

The pitch coke (i.e., soft carbon) obtained in Comparative Example 1 was sintered at a temperature of 2,850° C. or higher to obtain high crystalline artificial graphite having a $d_{002}$ of 0.338, a major axis length of 10 μm to 34 μm, a specific surface area of 1.4 m$_2$/g, and a tap density of 0.94 g/cc.

Comparative Example 4

A negative electrode active material was manufactured in the same manner as in Example 1, except that the high crystalline artificial graphite obtained in Comparative Example 3 was used instead of the low crystalline artificial graphite, and the coating amount of the amorphous carbon coating layer was 5% by weight, based on the total weight of the negative electrode active material.

The coated amorphous artificial graphite had a $d_{002}$ of 0.3361, a major axis length of 12 μm to 33 μm, a specific surface area of 0.8 m$^2$/g, and a tap density of 0.82 g/cc.

Manufacture of Lithium Secondary Battery

Example 4

(Manufacture of Negative Electrode)

The negative electrode active material manufactured in Example 1 as a negative electrode active material, acetylene black as a conductive material, styrene-butadiene rubber (SBR) as a binder, and carboxymethyl cellulose (CMC) as a thickener were mixed at a weight ratio of 96:1:2:1, and the resulting mixture was mixed with water (H$_2$O) serving as a solvent to prepare uniform negative electrode active material slurry.

One surface of a copper current collector was coated with the resulting negative electrode active material slurry to a thickness of 65 μm, dried, rolled, and then punched with a constant size to manufacture a negative electrode.

(Manufacture of Lithium Secondary Battery)

LiNi$_{0.33}$Mn$_{0.33}$Co$_{0.33}$O$_2$ used as a positive electrode active material, acetylene black as a conductive material, and SBR as a binder were mixed at a weight ratio of 94:3.5:2.5, and NMP was added thereto to prepare positive electrode active material slurry. One surface of aluminum foil was coated with the resulting slurry, dried, rolled, and then punched with a constant size to prepare a positive electrode.

A polyolefin separator was sandwiched between the positive electrode and the negative electrode, and an electrolyte in which 1 M LiPF$_6$ was dissolved in a solvent obtained by mixing ethylene carbonate (EC) and diethyl carbonate (DEC) at a volume ratio of 30:70 was injected thereto to prepare a coin-shaped lithium secondary battery.

Examples 5 and 6

Lithium secondary batteries were manufactured in the same manner as in Example 4, except that the negative electrode active materials manufactured in Examples 2 and 3 were used as the negative electrode active material, respectively.

Comparative Examples 5 to 8

Lithium secondary batteries were manufactured in the same manner as in Example 4, except that the negative electrode active materials manufactured in Comparative Examples 1 to 4 were used as the negative electrode active material, respectively.

EXPERIMENTAL EXAMPLES

Experimental Example 1: XRD Analysis and Measurement

Figure 2:
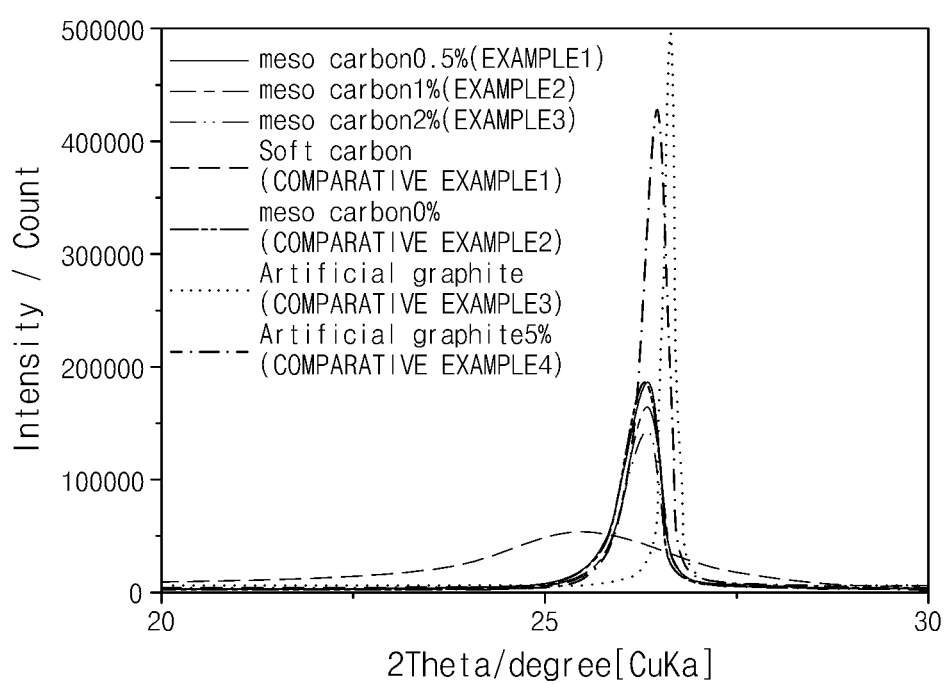
FIGS. 2 and 3 are graphs illustrating (002) and (110) peaks of Examples 1 to 3, and Comparative Examples 1 to 4, respectively, as measured by X-ray diffraction (XRD) analysis.
Figure 3:
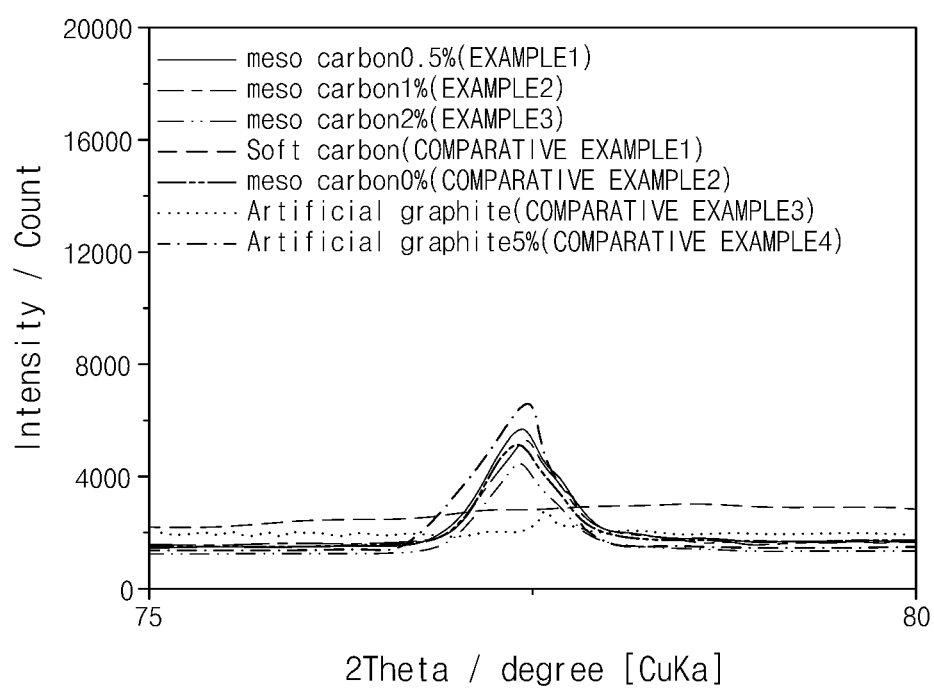

The negative electrode active materials manufactured in Examples 1 to 3 and Comparative Examples 1 to 4 were subjected to XRD measurements using Cu(Kα-radiation).
Target: Cu(Kα-radiation) graphite monochromator
slit: divergence slit=1°, receiving slit=0.1 mm, scattering slit=1°
Measuring range and step angle/measuring time:
(110) Plane: 76.5°<2θ<78.5°, 4°/1 minute (=0.2°/3 seconds)
(002) Plane: 20.0°<2θ<32.0°, 4°/1 minute (=0.2°/3 seconds), where 2θ represents a diffraction angle.
The results values of $d_{002}$, $I_{110}$ and $I_{110}/I_{002}$ of the negative electrode active materials of Examples 1 to 3 and Comparative Examples 1 to 4 measured by XRD are listed in the following Table 2, and the graphs plotted for the (002) and (110) peaks on the XRD graph are shown in FIGS. 2 and 3, respectively.

TABLE 2

| | $d_{002}$ (negative electrode active material) | $I_{110}$ | Orientation index ($I_{110}/I_{002}$) | Lc |
|---|---|---|---|---|
| Example 1 | 0.3390 | 3831 | 0.0268 | 15.7 |
| Example 2 | 0.3387 | 3349 | 0.0263 | 15.2 |
| Example 3 | 0.3390 | 2905 | 0.0261 | 15.1 |
| Comparative Example 1 (S/C) | 0.3494 | Nearly not observed | — | 3.01 |
| Comparative Example 2 (low crystalline artificial graphite) | 0.3396 | 3400 | 0.0238 | 15.4 |
| Comparative Example 3 (high crystalline artificial graphite) | 0.3345 | 1630 | 0.0148 | 23.2 |
| Comparative Example 4 (high crystalline artificial graphite + amorphous coating layer (5 wt %)) | 0.3361 | 3330 | 0.016 | 23.0 |

In Table 2, the Lc(002) and $d_{002}$ of each of the negative electrode active materials of Examples 1 to 3 and Comparative Examples 1 to 4 were calculated using the following Equations 1 and 2:

$$d002 = \lambda/2 \sin\theta \quad \text{<Equation 1>}$$

Also, $L_c$ (002), which is a crystallite size in C-axis direction of a particle, can be calculated by Equation 2 below as Scherrer equation which calculates a crystallite size $L_c$ of Examples 1 to 3 and Comparative Examples 1 to 4.

$$L_c = \frac{K\lambda}{\beta_{(2\theta)}\cos\theta} \quad \text{<Equation 2>}$$

K=Scherrer constant (K=0.9)
β=Full width at half-maximum
λ=Wavelength (0.154056 nm)
θ=Angle at maximum peak As listed in Table 2, when the negative electrode active materials of Examples 1 to 3 were subjected to XRD measurements, the crystallite size Lc (002) in a c-axis direction was in a range of 15.1 nm to 15.7 nm, and the interplanar spacing $d_{002}$ of (002) plane was in a range of greater than 0.338 nm and less than 0.3396 nm. From the results, it could be seen that the negative electrode active materials of Examples 1 to 3 were in the form of meso carbon which was in a mesophase between the negative electrode active material of Comparative Example 1 (0.3494 nm) as soft carbon, and the negative electrode active material of Comparative Example 3 (0.3345 nm) as high crystalline artificial graphite.

Referring to Table 2 and FIGS. 2 and 3, it could be also seen that the main peaks, (002) peak and (110) peak, of graphite were observed in the negative electrode active materials of Examples 1 to 3 and Comparative Examples 2 to 4, which was derived from the fact that the negative electrode active materials of Examples 1 to 3 and Comparative Examples 2 to 4 had a bit more crystallinity than that of Comparative Example 1 in which the negative electrode active material was only composed of soft carbon.

Specifically, the $I_{110}$ peaks were not observed for the soft carbon of Comparative Example 1 because the soft carbon had a very low degree of crystallization, and thus became amorphous.

From the XRD measurement results, the presence or absence of the $I_{100}$ peaks was significant, but the intensity of the $I_{100}$ peak was not significant since it was able to vary according to the measurement conditions such as the amount and height of a sample to be measured, etc.

Meanwhile, the ratios such as $I_{110}/I_{002}$, that is, orientation indexes, were able to be compared. By comparing the ratios for the negative electrode active materials of Examples 1 to 3, and Comparative Example 2, it could be seen that the $I_{110}/I_{002}$ ratios tended to increase due to amorphousness, depending on the presence or absence of the carbon coating layer. This indicates that the carbon coating layer has an influence on $I_{110}$.

From the fact that the high crystalline artificial graphite as in Comparative Example 3 and 4 had a lower $I_{110}/I_{002}$ ratio than the low crystalline artificial graphite, it could be also seen that the high crystalline artificial graphite exhibited high (002) crystallinity.

Experimental Example 2: Measurement of Physical Properties of Negative Electrode Active Material <Measurement of Specific Surface Area>

The specific surface area of each of the negative electrode active materials of Examples 1 to 3 and Comparative Examples 1 to 4 was measured using Brunauer-Emmett-Teller (BET) method For example, it may be measured with BET six-point method by means of a nitrogen gas adsorption method using a porosimetry analyzer (Bell Japan Inc., Belsorp-II mini).

<Measurement of Particle Size Distribution>

As a distribution of the average particle size of the negative electrode active material, the particle size distribution of each of the negative electrode active materials of Examples 1 to 3 and Comparative Examples 1 to 4 was measured for $D_{10}$, $D_{50}$, and $D_{90}$. In this case, $D_{10}$, $D_{50}$, and $D_{90}$ represent particle sizes based on 10%, 50%, and 90% of the particle size distribution, respectively.

The particle size distribution of each of the negative electrode active materials of Examples 1 to 3 and Comparative Examples 1 to 4 was measured using a laser diffraction method (Microtrac MT 3000).

<Measurement of Tap Density>

The tap density was measured as follows. 20 g of each of the negative electrode active materials of Examples 1 to 3 and Comparative Examples 1 to 4 was charged into a vessel, and vibrated up and down 1,000 times. Then, the resulting final volume of the negative electrode active material was measured, and calculated as an apparent density.

The results of the specific surface area, particle size distribution and tap density according to the measurement methods are listed in the following Table 3 and shown in FIG. 4.

TABLE 3

| Examples | Tap density (g/cc) | BET specific surface area (m²/g) | Particle size distribution (μm) (length of major axis) | | |
|---|---|---|---|---|---|
| | | | $D_{10}$ | $D_{50}$ | $D_{90}$ |
| Example 1 | 0.93 | 5.28 | 6.24 | 11.5 | 19.1 |
| Example 2 | 0.85 | 4.73 | 6.01 | 11.3 | 18.8 |
| Example 3 | 0.88 | 3.07 | 6.41 | 11.3 | 18.3 |
| Comparative Example 1 | 0.77 | 2.03 | 7.61 | 12.68 | 21.38 |
| Comparative Example 2 | 0.68 | 8.98 | 6.29 | 11.7 | 19.3 |
| Comparative Example 3 | 0.95 | 1.4 | 10.1 | 19.3 | 34.0 |
| Comparative Example 4 | 0.82 | 0.8 | 12.1 | 20.4 | 33.6 |

As listed in Table 3, it was revealed that the tap densities of the negative electrode active materials of Examples 1 to 3 of the present invention were in a range of 0.85 g/cc to 0.93 g/cc, the tap densities of which were improved than those of Comparative Examples 1 and 2. This indicates that, since each of the negative electrode active materials includes the amorphous carbon coating layer in the case of Examples 1 to 3, the tap densities of the negative electrode active materials are improved due to an effect of reducing a friction area of a surface thereof.

In addition, the BET specific surface areas of the negative electrode active materials of Examples 1 to 3 were in a range of 3 m²/g to 6 m²/g, which were advantageous to output characteristics and initial efficiency characteristics of the secondary batteries. Also, such BET specific surface areas were able to have an influence on the shelf life characteristics after high-temperature storage, in which the residual capacity was measured upon high-temperature storage.

On the other hand, the BET specific surface area of the negative electrode active material of Comparative Example 2 was higher than those of Examples 1 to 3. In this case, the residual capacity upon high-temperature storage was able to be further lowered.

Also, it could be seen that the BET specific surface areas of the negative electrode active materials of Comparative Examples 3 and 4 were twice lower than those of Examples 1 to 3 of the present invention. In this case, the output performance of the secondary battery was degraded due to relative difficulty of movement of lithium ions.

Figure 4:
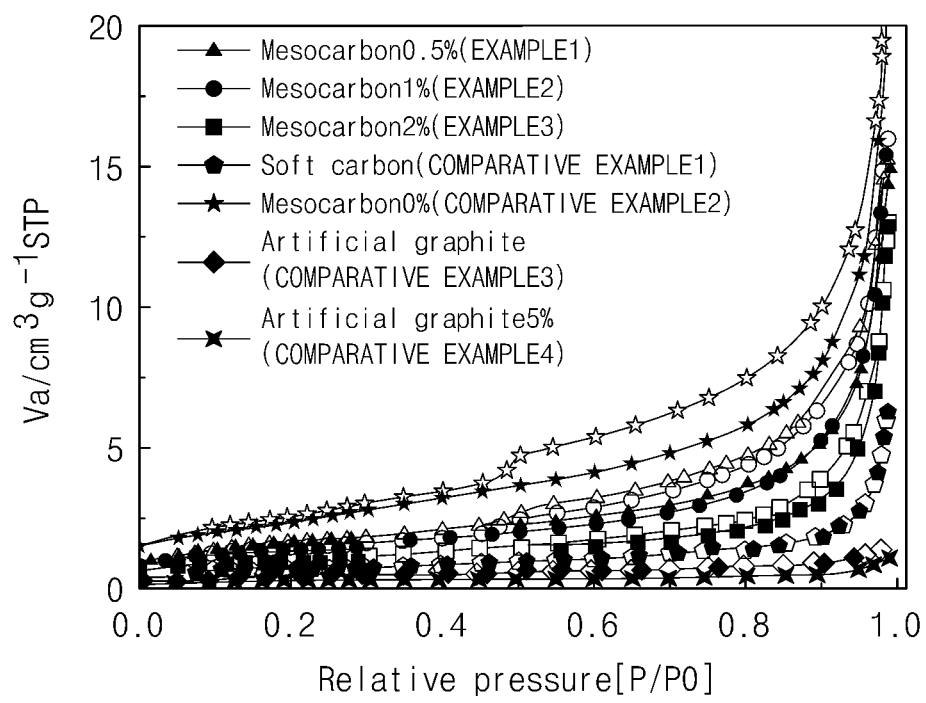
FIG. 4 is a graph plotted by comparing specific surface areas of negative electrode active materials of Examples 1 to 3, and Comparative Examples 1 to 4.

Meanwhile, referring to FIG. 4, it could be seen from the nitrogen gas adsorption/desorption isotherm that the negative electrode active materials of Examples 1 to 3, each of which included the carbon coating layer, had a lower BET value than that of Comparative Example 2, and also seen from the comparison of Examples 1 to 3 that the specific surface area values were reduced in proportion to the carbon coating content. Generally, the lower BET values may be advantageous to the high-temperature storage characteristics.

Also, the soft carbon corresponding to Comparative Example 1 had a disadvantage in that it was difficult to commercialize since the soft carbon had a low absolute capacity of 245.4 mAh/g even when the soft carbon had a low BET value. On the other hand, the capacity and high-temperature storage of the negative electrode active materials of Examples 1 to 3 including the carbon coating layer were superior to that of Comparative Example 1.

Experimental Example 3: Measurement of Initial Efficiency and Charging/Discharging Capacity of Lithium Secondary Battery The lithium secondary batteries (coin-shaped half batteries) manufactured in Examples 4 to 6 and Comparative Examples 5 and 6 were discharged under a constant current/constant voltage (CC/CV) condition until the constant voltage reached 5 my at a constant current (CC) of 0.1 C to measure the discharging capacity at the 1st cycle. Thereafter, the lithium secondary batteries were kept for 20 minutes, and continued to be charged until the constant voltage reached 1.5 V at a constant current of 0.1 C to measure the charging capacity. Each of the batteries was repeatedly subjected to the charging and discharging processes to measure the capacity. The results are listed in the following Table 4 and shown in FIG. 5.

TABLE 4

| Examples | 1st Cycle | |
|---|---|---|
| | $Q_{dis}$ (mAh/g) | $C_{eff}$ (%) |
| Example 4 | 298.8 | 88.7 |
| Example 5 | 297.9 | 87.4 |
| Example 6 | 303.2 | 89.5 |
| Comparative Example 5 | 245.4 | 82.9 |
| Comparative Example 6 | 291.3 | 85.8 |

Figure 5:
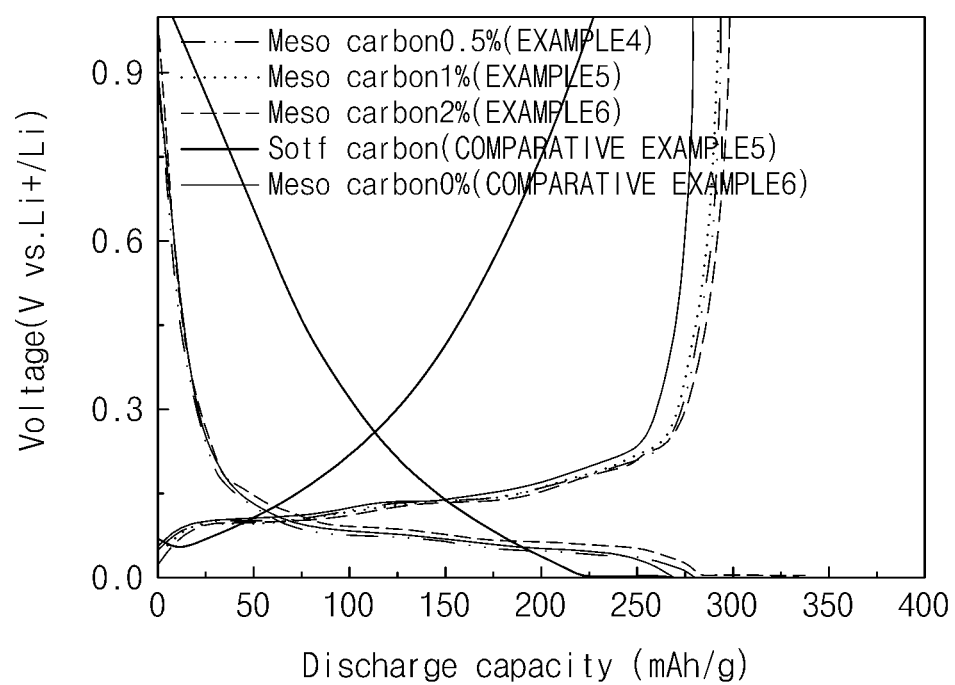
FIG. 5 is a graph illustrating capacity characteristics of lithium secondary batteries used in Examples 4 to 6, and Comparative Examples 5 and 6.

As listed in Table 4 and shown in FIG. 5, it was revealed that the discharging capacity and initial efficiency of the secondary batteries of Examples 4 to 6 increased by 5% or more, respectively, compared to those of the secondary batteries of Comparative Examples 5 and 6. It could be seen that since the negative electrode active materials of Examples 1 to 3 of the present invention had constant and improved $d_{002}$ values when an amorphous carbon coating layer was formed on low crystalline artificial graphite that was slowly crystallized starting from soft carbon, the uniform resistance was applied to the negative electrode active materials due to a decrease in specific surface area on which a side reaction with an electrolyte solution occurred, resulting in improvement in the initial efficiency and reversible capacity of the secondary batteries.

Experimental Example 4: Measurement of Output Characteristics of Lithium Secondary Battery The coin-shaped lithium secondary batteries manufactured in Examples 4 to 6 and Comparative Examples 5, 7 and 8 were discharged under a constant current/constant voltage (CC/CV) condition until the constant voltage reached 5 mV at a constant current (CC) of 0.1 C to measure the discharging capacity at the 1st cycle. Thereafter, the lithium secondary batteries were kept for 20 minutes, and continued to be charged until the constant voltage reached 1.5 V at a constant current of 0.1 C to measure the charging capacity. Thereafter, the lithium secondary batteries were kept for 20 minutes, and then discharged under a C-rate condition. After charging at 0.1 C, the lithium secondary batteries were tested at room temperature under conditions of discharging C-rates 0.1 C, 0.5 C, 1.0 C, and 2.0 C. Among these, the results of the residual capacity (%) at the 2 C-rate are listed in the following Table 5 and shown in FIG. 6.

TABLE 5

| Examples | Capacity(%) normalized at 2 C-rate |
|---|---|
| Example 4 | 99.8 |
| Example 5 | 99.0 |
| Example 6 | 99.4 |
| Comparative Example 5 | 95.1 |
| Comparative Example 7 | 96.2 |
| Comparative Example 8 | 96.3 |

As listed in Table 5, it was revealed that the secondary batteries of Examples 4 to 6 of the present invention had a very high capacity at 2 C-rate of approximately 99% or more.

On the other hand, it could be seen that the capacity of the lithium secondary battery of Comparative Example 5 in which soft carbon was used was reduced by approximately 4%, compared to the lithium secondary batteries of Examples 4 to 6, and that the capacity of the lithium secondary batteries of Comparative Examples 7 and 8 in which high crystalline artificial graphite was used was reduced by approximately 3%, compared to the lithium secondary batteries of Examples 4 to 6.

Figure 6:
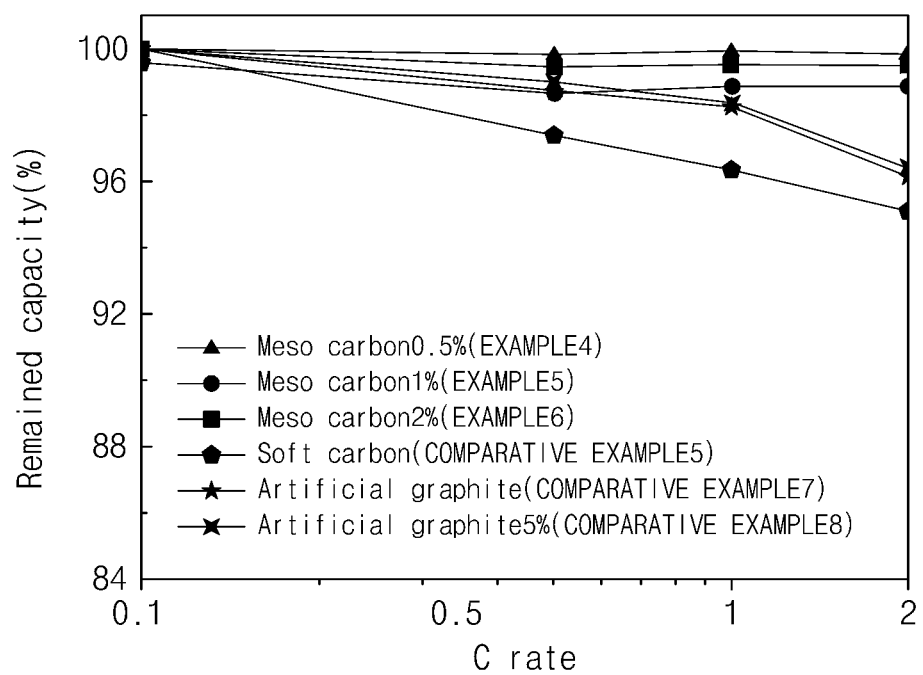
FIG. 6 is a graph illustrating output characteristics of lithium secondary batteries used in Examples 4 to 6, and Comparative Examples 5, 7 and 8.

As seen from FIG. 6, it could be also seen that the capacities of the lithium secondary batteries of Examples 4 to 6 at all 0.5 C, 1 C and 2 C were remarkably improved, compared to those of the secondary batteries of Comparative Examples 5, 7 and 8.

It could be concluded that since the secondary batteries of Examples 4 to 6 of the present invention comprise the negative electrode active material having a certain $d_{002}$ range when amorphous carbon coating layer was formed on low crystalline artificial graphite, the irreversible capacity of the negative electrode active material used in Comparative Example 5 was compensated, and the rate characteristics was improved, compared to the negative electrode active materials used in Comparative Examples 7 and 8.

What is claimed is:

1. A negative electrode active material comprising:
   low crystalline artificial graphite; and
   an amorphous carbon coating layer formed on the low crystalline artificial graphite, wherein a coating amount of the amorphous carbon coating layer is in a range of 0.1% by weight to 4% by weight, based on the total weight of the negative electrode active material
   wherein the low crystalline artificial graphite has an interplanar spacing $d_{002}$ of a (002) plane is in a range of greater than 0.338 nm to less than 0.3396 nm, as measured by X-ray diffraction (XRD)
   wherein the negative electrode active material has a non-spherical shape with an average aspect ratio (a length on a major axis/a length on a minor axis) of 0.1 to 1 and has a tap density in a range of 0.6 g/cc to 1 g/cc
   wherein the negative electrode active material has a crystal orientation index with respect to an area ratio $I_{(110)}/I_{(002)}$ in a range of 0.0238 to 0.0268, the area ratio being obtained by integrating XRD peaks.

2. The negative electrode active material of claim 1, wherein the low crystalline artificial graphite is obtained by sintering soft carbon in a temperature range of 2,000° C. or higher and less than 2,800° C.

3. The negative electrode active material of claim 2, wherein the low crystalline artificial graphite has a peak's full width at half-maximum (FWHM) in a range of 0.5° to 0.6°, as measured by XRD.

4. The negative electrode active material of claim 1, wherein the negative electrode active material has an $I_{(002)}$ peak's full width at half-maximum (FWHM) in a range of 0.5° to 0.6° as measured by XRD.

5. The negative electrode active material of claim 1, wherein the negative electrode active material has a crystallite size Lc(002) in a c-axis direction in a range of 15.1 nm to 15.7 nm, as measured by XRD.

6. The negative electrode active material of claim 1, wherein the negative electrode active material has a specific surface area (BET) in a range of 1 m²/g to 10 m²/g.

7. A negative electrode comprising:
   a current collector; and
   the negative electrode active material of claim 1 formed on at least one surface of the current collector.

8. A lithium secondary battery comprising the negative electrode of claim 7.

9. A method of manufacturing a negative electrode active material of claim 1, the method comprising:
   sintering soft carbon at a temperature range of 2,000° C. or higher to 2,800° C. to obtain low crystalline artificial graphite; and
   forming an amorphous carbon coating layer on the low crystalline artificial graphite.

10. The method of claim 9, wherein the soft carbon is formed by carbonizing one or a mixed carbonaceous material of two or more selected from the group consisting of a polyvinyl alcohol, a polyvinyl chloride, a carboniferous pitch, a petroleum-based pitch, a mesophase pitch, and heavy oil.

11. The method of claim 9, wherein the amorphous carbon coating layer is formed by mixing low crystalline carbon particles with an amorphous carbon precursor, and thermally treating the resulting mixture.

12. The method of claim 11, wherein the amorphous carbon precursor is one or a mixture of two or more selected from the group consisting of glucose, fructose, galactose, maltose, lactose, sucrose, a phenolic resin, a naphthalene resin, a polyvinyl alcohol resin, a urethane resin, a polyimide resin, a furan resin, a cellulose resin, an epoxy resin, a polystyrene resin, a resorcinol-based resin, a phloroglucinol-based resin, a carboniferous pitch, a petroleum-based pitch, tar, and a medium oil.

13. The method of claim 11, wherein a mixing ratio of the low crystalline carbon particle and the amorphous carbon precursor is in a range of 100:0.2 to 20, based on the weight ratio.

14. The method of claim 11, wherein the thermal treatment is performed at a temperature range of 160° C. to 1,400° C.

* * * * *